United States Patent [19]

Goulart

[11] Patent Number: 4,674,760
[45] Date of Patent: Jun. 23, 1987

[54] STEERING KNUCKLE

[75] Inventor: Joseph F. Goulart, West Bloomfield, Mich.

[73] Assignee: Chrysler Motors Corporation, Highland Park, Mich.

[21] Appl. No.: 848,020

[22] Filed: Apr. 3, 1986

[51] Int. Cl.⁴ .............................................. B62D 7/18
[52] U.S. Cl. .................................... 280/88; 180/253; 280/96.1; 280/93
[58] Field of Search ................ 280/96.1, 88; 188/72.4, 188/18 A, 72.5, 369, 370

[56] References Cited

U.S. PATENT DOCUMENTS

| 1,613,768 | 1/1927 | Perrot | 280/96.1 |
|---|---|---|---|
| 2,435,814 | 2/1940 | Allison | 280/96.1 |
| 3,241,436 | 5/1966 | Afanador et al. | 188/370 |
| 3,749,415 | 7/1973 | Sampatacos | 280/96.1 |
| 3,865,394 | 2/1975 | Epner | 280/96.1 |
| 3,940,159 | 2/1976 | Pringle | 280/96.1 |
| 3,941,221 | 3/1976 | Pringle | 188/18 A |
| 4,031,986 | 6/1977 | Thompson | 188/72.4 |

Primary Examiner—John J. Love
Assistant Examiner—Karin L. Ferriter
Attorney, Agent, or Firm—Edward A. Craig

[57] ABSTRACT

A steering knuckle is provided which has a unitary sheet metal construction. A steering arm is integral with the steering knuckle. Brake cylinder structure adapted to operatively receive brake piston structure is carried by and extends outwardly from the steering knuckle.

3 Claims, 3 Drawing Figures

STEERING KNUCKLE

BACKGROUND OF THE INVENTION

1. Field of the Invention

This invention relates to steering knuckles for vehicles.

2. Prior Art

Conventionally, steering knuckles for vehicles have been fabricated either by casting or forging. This process is relatively expensive and results in a relatively heavy component. Additionally, cast or forged steering knuckles have required subsequent machining which adds to the expense.

It has been suggested in the past that steering knuckles be fabricated from sheet metal. For example, Pringle, U.S. Pat. No. 3,940,159 illustrates a pressed metal steering knuckle. However, Pringle finds it necessary to provide a separate steering arm. The steering arm forms an operational feature of a steering knuckle, the steering arm being the element which actually drives the wheel being steered into the desired directional mode.

Pressed metal steering knuckles are also set forth in the patents to Epner et al, U.S. Pat. No. 3,865,394 and Sampatacos U.S. Pat. No. 3,749,415. These patents also illustrate pressed metal steering knuckles. The Sampatacos patent again discloses a structure wherein the steering arm must be separately fabricated and attached to the steering knuckle. The Epner et al construction discloses a steering knuckle with an integral steering arm which is a desirable advance in the art. However, in this instance, in order to obtain structural rigidity, Epner et al has found it necessary to crimp the steering arm thereby involving a separate operation and also suggests use of a separate spacer for the arm.

In accordance with the present invention, a steering rod is used to provide structural rigidity of the arm, with the arm not being crimped, thereby eliminating a separate part or operation. More importantly, the sheet metal knuckle of the present invention incorporates brake cylinder structure as a fixed part thereof which permits utilization of a brake structure without the separate provision of cylinder means.

SUMMARY OF THE INVENTION

The steering knuckle comprises a unitary sheet metal, generally cup-shaped member having a bottom wall with substantially continuous side wall structure extending outwardly therefrom. The side wall structure has means therein for connecting the steering knuckle to control arm means to enable pivoting of the steering knuckle about an axis. The side wall structure and bottom wall coalesce at one point to form an integral steering arm for pivoting the steering knuckle about the axis. The bottom wall has means for connection to a wheel. Brake cylinder structure extends outwardly from the bottom wall on the side thereof remote from the side wall structure. The brake cylinder structure is adapted to operatively receive brake piston structure. Preferably, two brake cylinders are provided to receive a pair of pistons. The steering arm is generally cup-shaped and is defined by the bottom wall and side wall structure. The cup-shaped steering arm has a sufficient interior size to receive a steering rod element which also serves as a structural reinforcement for the steering arm.

BRIEF DESCRIPTION OF A PREFERRED EMBODIMENT

Figure 1:
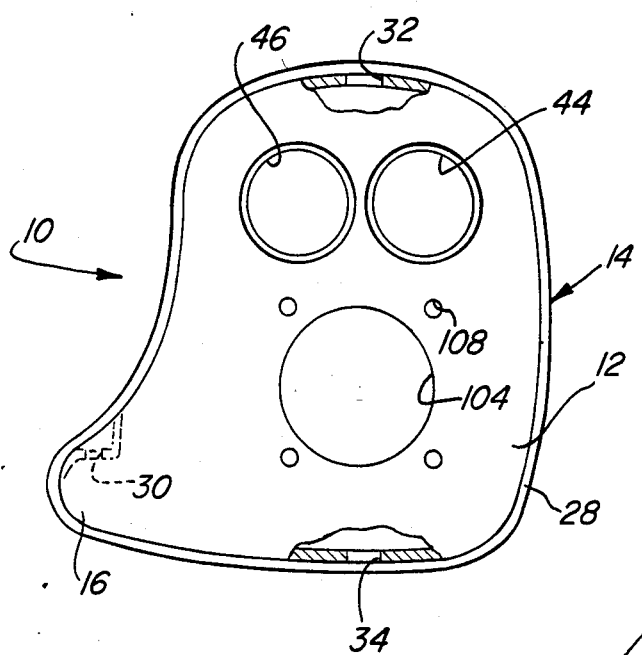
FIG. 1 is a front-elevational view forming one embodiment of the steering knuckle of the present invention.

As will be noted in the figures, the steering knuckle 10 is a unitary sheet metal, generally cup-shaped member. The knuckle 10 has a bottom wall 12 from which extends a substantial continuous side wall structure 14. The side wall structure 14 extends outwardly from the bottom wall 12. The side wall structure 14 and bottom wall 12 coalesce at one point, as shown in FIG. 1 the lower left hand corner, to form an integral steering arm 16 for pivoting the steering knuckle.

The steering arm 16 is also generally cup-shaped and is defined by the bottom wall 12 and side wall structure 14. The cup-shaped steering arm 16 has a sufficient interior size to receive a steering rod element 18. The steering rod element 18 is retained in place by means of bolt structure 20 which permits pivoting thereof. As will be noted by the arrow 22, the steering rod element 18 is pushed in and out to cause pivoting of the steering knuckle 10 and consequent pivoting of a wheel mounted thereto. A wheel (not shown) is securable to a bearing casing 24 by means of threaded elements and lugs (not shown) which are receivable in four threaded openings 26 which are provided in the face of the bearing casing 24.

In addition to providing the means for pivoting the steering knuckle 10, the steering rod element 18 also serves as structural reinforcement for the steering arm 16. This feature contributes to the ability to use sheet metal for the fabrication for the steering knuckle 10.

A flange 28 extends entirely around the periphery of the side wall structure 14. The flange 28 aids in giving the steering knuckle 10 structural rigidity.

The bolt structure 20 which secures the steering rod element 18 to the steering arm 16 extends through a recessed opening 30 provided in the steering arm 16. While referred to as a bolt structure, it will be appreciated that this element is not necessarily a separate element but may form part of a fixed portion of the steering rod element 18. Preferably, the structure is fixedly attached to the steering rod element 18 so that it may be not be separated in use. Additionally, conventionally an anti-sway bar (not shown) is secured to the steering knuckle 10 in the area of the steering rod element 18.

As will be noted in FIG. 1, the steering knuckle 10 is provided with openings 32, 34 in the upper and lower portions of the side wall structure 14. A lower control arm 36, forming part of the suspension, is secured to the steering knuckle 10 by means of ball joint structure extending through the lower opening 34. An upper control arm 38 is secured to the upper portion of the steering knuckle 10 by means of ball joint structure 40 which extends through the upper opening 32. The upper control arm 38 is illustratively secured to chassis structure 42. The openings 32, 34 define a steering axis about which the steering knuckle 10 pivots.

Brake cylinder structure, comprising a pair of brake cylinders 44, 46, is carried on one face of the bottom wall 12 as by welding. The cylinders 44, 46 extend outwardly from the bottom wall 12 on the side of the bottom wall 12 remote from the side wall structure 14. The brake cylinders 44, 46 are adapted to operatively receive brake piston structure comprising pistons 48, 50 carried by a brake plate 52. A brake bridge 54 comprising a plate 56 having a pair of openings 58, 60 is received on the brake cylinders 44, 46. The plate 56 has a forwardly bent over portion 62 which extends away from the steering knuckle 10. A bent down portion 64 extends from the portion 62. The brake plate 52 is received inside the structure defined by portions 62, 64.

A notch 66 is provided in the upper edge of the brake plate 52. The notch 66 receives a hook 68 provided on the upper edge of brake pad plate 70 to mount the brake pad plate 70 thereon. The brake pad plate 70 carries a brake pad 72. Inturned guide flanges 74, 76 are provided on the side edges of the brake pad plate 70. The guide flanges 74, 76 wrap around angled edge portions 78, 80 provided on the lower corners on the brake plate 52. A second outer brake pad plate 82 is provided. A brake pad 84 is provided on the inner surface of the brake pad plate 82. The plate 82 is provided with a hook 86 which is received in a slot 88 provided in the bent down portion 64 of the brake bridge 54. The brake pad plate 82 is operatively hung from the brake bridge in operation of the brake structure.

The bearing casing 24 forms part of a self-contained wheel bearing 90. As will be noted, the bearing casing 24 is rectangular in shape. A floating brake disk 92 has a central opening 94 which is also rectangular in shape and is received on the bearing casing 24 in non-rotative fashion. The wheel bearing casing 24 contains internal bearing structure which permits rotation of the bearing casing 24 and associated wheel on an axle stub 96. The axle stub 96 is fixedly secured to a larger diameter fixed axle structure 98. A mounting plate 100 is fixedly secured to the axle structure 98 intermediate the ends thereof. A portion 102 of the axle structure 98 extends inwardly from the plate 100 as will be noted in dotted lines in FIG. 2.

Figure 3:
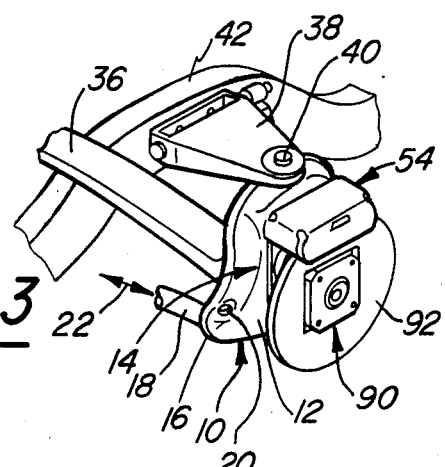
FIG. 3 is a view in perspective of the steering knuckle and brake structure operatively assembled together.

The bottom wall 12 of the steering knuckle 10 is provided with an enlarged opening 104. A similar opening 106 is provided in the brake bridge plate 56. These openings receive the portion 102 of the axle structure when the various components are mounted together as shown in FIG. 3. The openings 104, 106 serve to center and align all of the various components. A plurality of bolt hole openings 108, 110, 112 are provided in each of the bottom wall 12 of the steering knuckle, brake bridge plate 56 and mounting plate 100 to permit insertion of bolt structures 112 to fixedly secure these components together when they are assembled as shown in FIG. 3.

As will be noted, the bottom edges 114, 116, 118 of the brake plate 52, inner brake pad plate 70, outer brake pad plate 82 are arcuate to thereby fit over the fixed axle structure 98.

Figure 2:
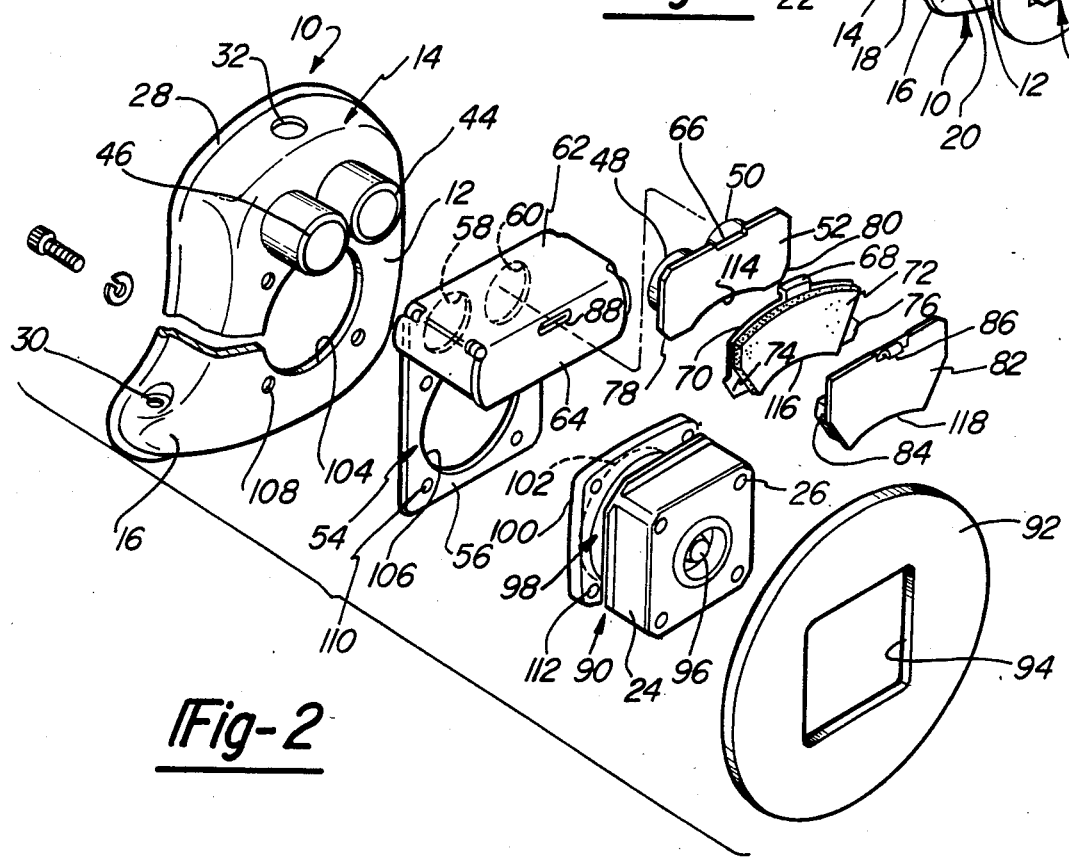
FIG. 2 is an exploded view illustrating the steering knuckle of FIG. 1 in relationship to associated brake structure.

When the components illustrated in FIG. 2 are assembled, the brake bridge 54 is first inserted over the brake cylinders 44, 46. The brake plate 52 is then mounted beneath the bent over portion 62 with the pistons 48, 50 being inserted into the cylinders 44, 46. The inner brake pad plate 70 is then hooked onto the brake plate 52. The disk 92 is then mounted on the bearing casing 24. Finally, the outer brake pad plate 82 is mounted on the inner face of the bent down portion 64 of the brake bridge so that all of the components are positioned beneath the bent over portion 62. It will be appreciated, forcing of brake fluid under pressure through the brake cylinders 44, 46 will force the pistons 48, 50 outwardly thereby compressing the brake pads 72, 84 against the disk 92 thus braking rotation of the bearing casing 24 and consequently the wheel which is mounted thereon.

As will be appreciated, the construction assembly and operation of the various brake elements as above-described is for reference purposes only, and does not form part of the presently claimed invention.

Having thus described my invention, I claim:

1. A steering knuckle comprising a unitary sheet metal, generally cup-shaped member having a bottom wall, substantially continuous side wall structure extending outwardly in one direction from the bottom wall, the side wall structure having means therein for connecting the steering knuckle to control arm means to enable pivoting of the steering knuckle about an axis, the side wall structure and bottom wall coalescing at one point to form an integral laterally extending steering arm for pivoting the steering knuckle about said axis, the bottom wall having means for connection to a wheel, and brake cylinder structure extending outwardly in a second direction from the bottom wall on the side thereof remote from the side wall structure, said brake cylinder structure being configured to operatively receive brake piston structure.

2. A steering knuckle as defined in claim 1, further characterized in that said laterally spaced apart brake cylinder structure comprises a pair of brake cylinders.

3. A steering knuckle as defined in claim 1, further characterized in that the steering arm is generally cup-shaped and defined by the bottom wall and side wall structure, the cup-shaped steering arm having a sufficient interior size to receive a steering rod element which also serves as structural reinforcement for the steering arm.

* * * * *